Patented Sept. 6, 1932

1,876,059

UNITED STATES PATENT OFFICE

HANS KLEIN, OF IDA-& MARIENHUTTE, NEAR SAARAU, GERMANY

PROCESS FOR OXIDIZING ORGANIC COMPOUNDS

No Drawing. Application filed September 27, 1926, Serial No. 138,125, and in Germany October 19, 1925.

There is a comparatively small number of agents which combine with alkali during reaction and can be used technically for oxidizing organic compounds. Many of them are too expensive while in the case of other cheaper substances, such as chlorine, the oxidation potential is too great for many purposes, thus promoting side-reactions. It has been found that the polythionic acids which are inexpensive and easy to obtain give very satisfactory results as oxidizing agents for organic compounds.

The oxidizing action of polythionates in alkaline solution may be imagined as taking place approximately as illustrated by the following equations:—

(a) Trithionates. They break up into thiosulphate and sulphite while combining with 2Me (Me represents an equivalent of a base ion).

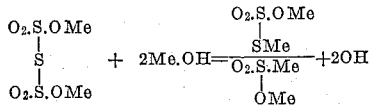

(b) Tetrathionates are converted into 2 molecules of thiosulphate, while combining with 2Me.

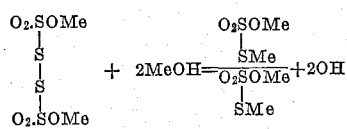

(c) Pentathionates. They break up into 2 mols. thiosulphate and 1 atom sulphur while combining with 2Me.

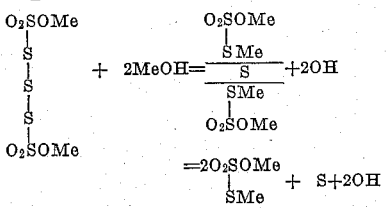

In all cases for each molecule of polythionate according to the formula, $$2OH \text{ (or } H_2O + O)$$

is set free, which explains the oxidizing action.

Example I

A solution is taken of the reaction product of one equivalent methylaniline, one equivalent carbon disulphide and one equivalent of a base. In a solution for instance of 250 ccms. it may be assumed that 18.0 grams methyl aniline, and 13.6 grams carbon disulphide were originally present, quantities which would be expected to give 32.7 grams dimethyl-diphenyl-thiuram-disulphide. To the solution of the corresponding dithiocarbamic acid prepared therefrom sufficient polythionate solution is added drop by drop while stirring, until the precipitation is complete. The resulting disulphide is pure white. The reaction mixture is allowed to stand 10–15 minutes. It is then filtered, washed with water and dried. Yield 28.5 grams = 88% of theoretical yield. The reaction can be carried out on any scale.

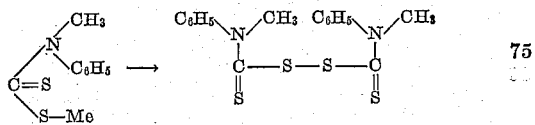

Example II (a) A solution of 1/50 mol N-dimethyldithiocarbamic acid salt in 100 ccms. water, prepared from 1/50 mol dimethylamine (=0.9 g.) and at the same time (b) a solution of a little more than the calculated amount of sodium tetrathionate also in 100 ccms. water are introduced drop by drop into 50 ccms. water during about an hour while stirring and cooling with ice. After another quarter of an hour the mixture is filtered with suction and the filtrate washed with water. Yield 2.130 grams N-N-N'-N'-tetramethylthiuramdisulphide. The reaction can be carried out on any scale.

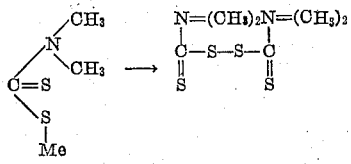

What I claim is:—

1. A method of producing N-substituted thiuramdisulphides consisting in oxidizing N-substituted dithiocarbamates with a solution of a polythionate.

2. A method of producing N-substituted thiuramdisulphides, consisting in oxidizing N-substituted dithiocarbamates with an alkaline solution of a polythionate.

In testimony whereof I have signed my name to this specification.

HANS KLEIN.